United States Patent [19]

Shoji et al.

[11] Patent Number: 5,230,233

[45] Date of Patent: Jul. 27, 1993

[54] LOCKING DEVICE FOR STEERING GEAR

[75] Inventors: Takeshi Shoji; Minoru Morikawa, both of Aichi, Japan

[73] Assignee: Kabushiki Kaisha Tokai Rika Denki Seisakusho, Aichi, Japan

[21] Appl. No.: 850,664

[22] Filed: Mar. 13, 1992

[30] Foreign Application Priority Data

Mar. 15, 1991 [JP] Japan .................................. 3-23237

[51] Int. Cl.⁵ ............................................ B60R 25/02
[52] U.S. Cl. ........................................ 70/252; 70/186
[58] Field of Search ................... 70/237, 252, 182–189

[56] References Cited

U.S. PATENT DOCUMENTS

| | | |
|---|---|---|
| 3,187,527 | 6/1965 | Moss et al. ............................. 70/252 |
| 3,673,829 | 7/1972 | Mizuno ................................. 70/252 |
| 3,680,335 | 8/1972 | Onishi .................................. 70/252 |
| 3,789,636 | 2/1974 | Nakashima ............................ 70/252 |
| 3,919,868 | 11/1975 | Lipschutz .............................. 70/252 |
| 4,266,414 | 5/1981 | Eichenauer ........................... 70/252 |
| 4,773,241 | 9/1988 | Peitsmeier et al. .................... 70/252 |
| 4,798,067 | 1/1989 | Peitsmeier et al. .................... 70/252 |
| 4,884,423 | 12/1989 | Fancher ................................ 70/252 |

FOREIGN PATENT DOCUMENTS

| | | |
|---|---|---|
| 3435084 | 4/1986 | Fed. Rep. of Germany ........ 70/252 |
| 240449 | 10/1988 | Japan ..................................... 70/252 |
| 240450 | 10/1988 | Japan ..................................... 70/252 |

Primary Examiner—Peter M. Cuomo
Assistant Examiner—Suzanne L. Dino
Attorney, Agent, or Firm—Finnegan, Henderson, Farabow, Garrett & Dunner

[57] ABSTRACT

A device for locking a steering gear having a body with a first cylindrical portion, a second cylindrical portion extending nearly perpendicular from the first cylindrical portion, and a reinforcing member disposed within the second cylindrical portion. The reinforcing member has an inner surface and an outer surface and a bottom portion connected to a tube containing the steering gear. The device also includes a locking bar disposed within the reinforcing member and movable between a locked position for locking the steering gear and an unlocked position to allow the steering gear to rotate, and means for moving the locking bar between the locked position and unlocked position.

7 Claims, 2 Drawing Sheets

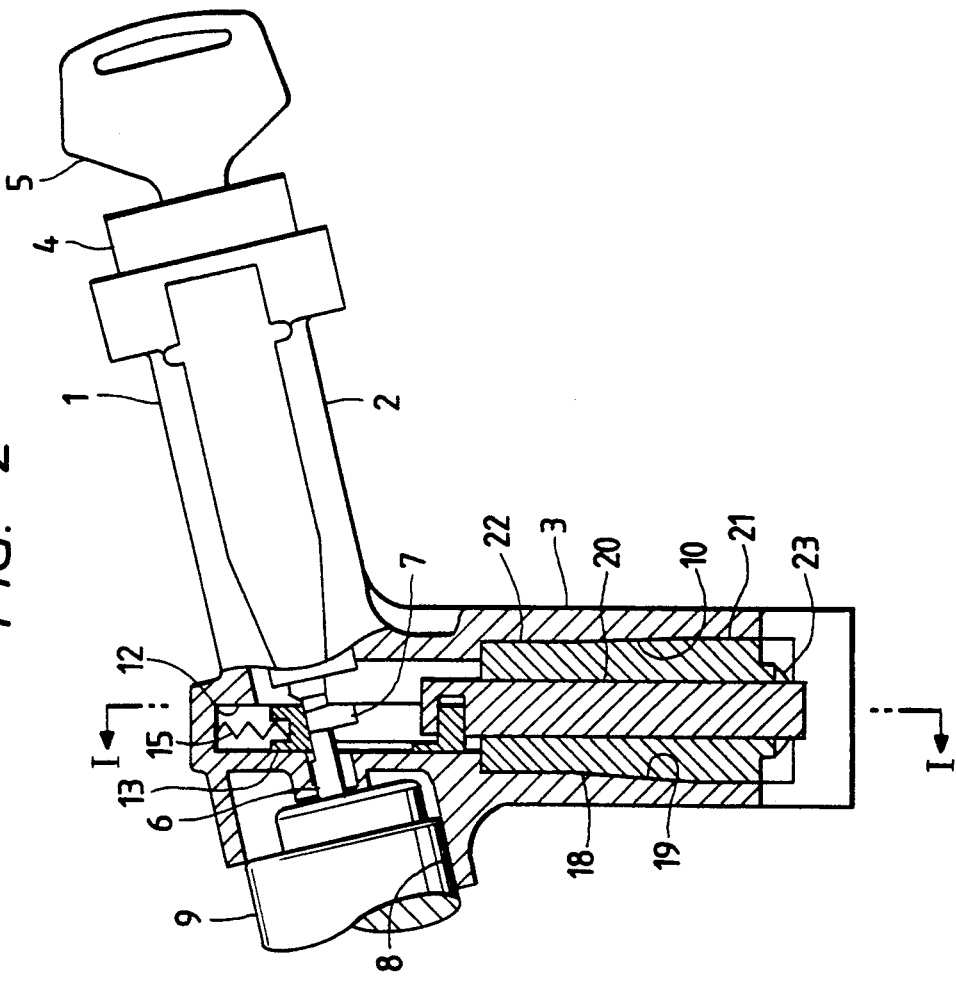
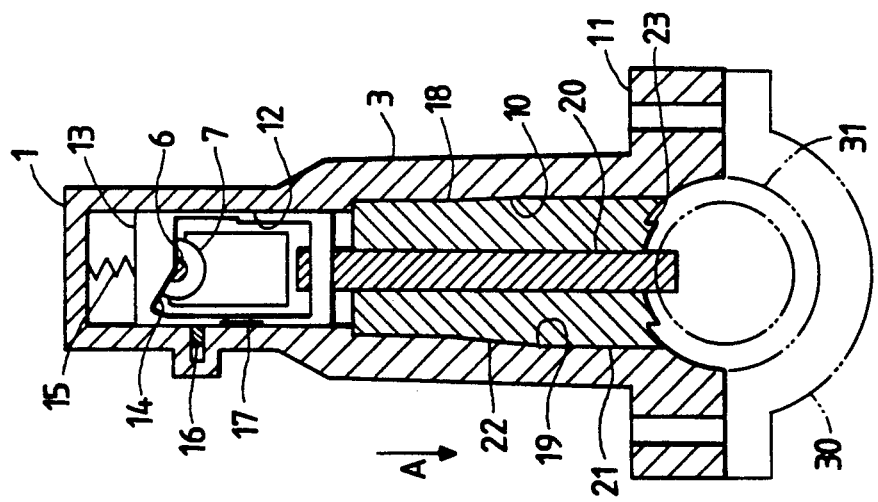

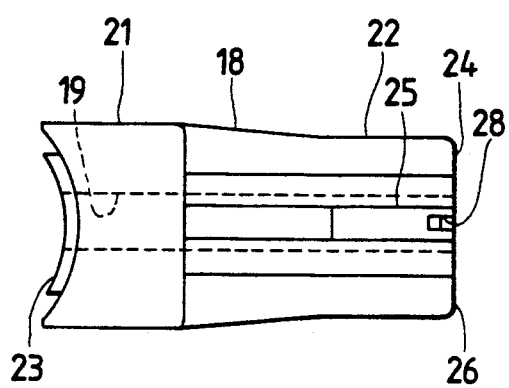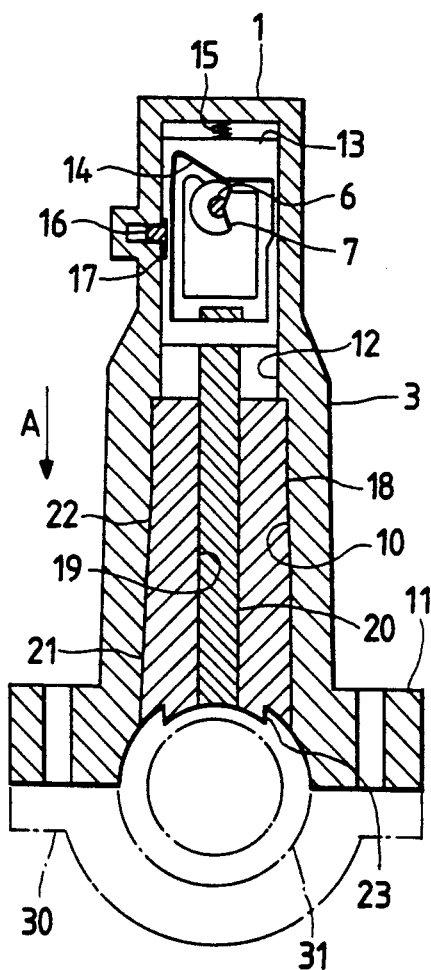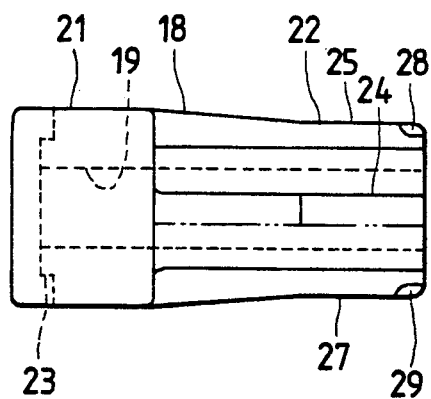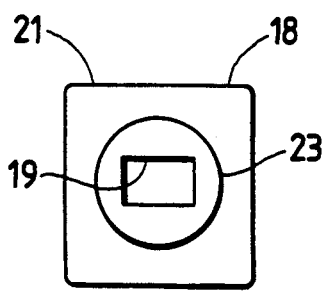

LOCKING DEVICE FOR STEERING GEAR

BACKGROUND OF THE INVENTION

1. Field of the Invention

The present invention relates to a device for locking a steering gear and includes a locking bar which may be protruded from the body of the device by external manipulation to engage the bar with the steering gear shaft to lock the shaft and prevent it from being turned.

2. Discussion of the Related Art

A conventional device for locking the steering gear of a motor vehicle includes a body, a cylinder in the body, and a locking bar which may be protruded from the body to the steering gear shaft by manipulation of the cylinder so that the bar is engaged with the shaft to lock it and prevent the steering gear shaft and associated steering wheel from being turned. If torque is applied to the steering wheel thus locked, a strong force acts on the body which guides the locking bar. For that reason, the body is made of a metal to withstand the strong force.

Recently, the parts of such a motor vehicle have been required to be reduced in weight to make the vehicle lighter. However, since the body of the conventional steering gear device is made of metal, it is difficult to reduce the weight of the body. It is possible to make the body out of a light alloy such as a magnesium alloy; however, such alloys are expensive and increase the cost of the device.

SUMMARY OF THE INVENTION

The present invention has been made in view of the above circumstances and has as an object to reduce the weight of a device for locking a steering gear without increasing the cost of the device.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the device for locking a steering gear of this invention comprises a body having a first cylindrical portion and a second cylindrical portion extending nearly perpendicular from the first cylindrical portion, a reinforcing member fitted within the second cylindrical portion, the reinforcing member having an inner surface, an outer surface and a bottom portion connected to a tube containing the steering gear, a locking bar disposed within the reinforcing member and movable between a locked position for locking the steering gear and an unlocked position for allowing the steering gear to rotate, and means for moving the locking bar between the locked position and unlocked position.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings, FIG. 1 is a sectional view of a part of a locking device which is an embodiment of the present invention;

FIG. 2 is a cutaway side view of the device;

FIG. 3 is a front view of the reinforcing member of the device;

FIG. 4 is a plan view of the reinforcing member;

FIG. 5 is a side view of the reinforcing member; and

FIG. 6 is a sectional view of the part of the locking device in a state different from that shown in FIG. 1.

DETAILED DESCRIPTION OF THE PREFERRED EMBODIMENT

An embodiment of the present invention is hereafter described in detail with reference to the drawings attached hereto.

FIGS. 1 through 6 show an exemplary embodiment of a device for locking the steering gear of a motor vehicle in accordance with the present invention. The device comprises a body 1, a cylinder 4, a cam shaft 6, a cam 7, a switch support 8, a switch 9, mounting juts 11, a sliding space 12, a locking stopper 13, a compressed helical spring 15, a locking lever 16, a reinforcing member 18, a locking bar 20, a curved securing metal member 30, and a tube 31.

The device includes a locking bar 20 which may be protruded from the body 1 of the device by external manipulation so that the bar is engaged with the steering shaft of the steering gear. The device is characterized in that the body 1 is molded of a resin; and a reinforcing member 18 is secured to the body therein so as to guide the bar. When the locking bar 20 is protruded from the body 1, the bar is engaged with the steering shaft to lock it to prevent the shaft from being turned.

Since the body is entirely molded of the resin, the weight of the body is reduced. Since the locking bar is guided by the reinforcing member secured to the body therein, the body is not damaged even if a strong force acts on the bar. For these reasons, the weight of the device can be reduced without increasing the cost thereof.

The body 1 is made of a nylon resin mixed with fiberglass and molded through the use of dies. As shown in FIG. 2, the body 1 includes a first cylindrical portion 2, and a second cylindrical portion 3 slenderly extending nearly perpendicular to the former. The cylinder 4 is fitted in the first cylindrical portion 2 so that the cylinder can be put in each of a locking position, an accessory switch-on position, an engine switch-on position, and an engine start position. An ignition key 5 of the motor vehicle can only be inserted into the cylinder 4 or pulled out of it when the cylinder 4 is in the locking position.

The cam shaft 6 extends from the cylinder 4 along the first cylindrical position 2 of the body 1. The cam 7 is integrally formed on the cam shaft 6 so that the cam is rotated when the ignition key 5 is inserted into the cylinder 4 and rotated. The tip of the cam shaft 6 projects into the switch support 8 formed on the first cylindrical portion 2 at the end thereof. The switch 9 is fitted in the switch support 8. The tip of the cam shaft 6 is fitted in the rotary shaft of the switch 9 so that a turn-on signal corresponding to the position of the cylinder 4 is sent out through the switch and turns on a relay.

The second cylindrical portion 3 of the body 1 has a support hole 10 of rectangularly shape in cross section. The mounting juts 11 are integrally formed on the second cylindrical portion 3 at both the sides of the support hole 10. The body 1 has a sliding space 12 provided at the end of the second cylindrical portion 3 and communicating with the support hole 10.

Means for moving the locking bar between a locked and unlocked position include a locking stopper 13, compressed helical spring 15, cam 7, and cam shaft 6. The locking stopper 13, which is shaped as a rectangular frame, is provided in the sliding space 12. The cam shaft 6 extends through the locking stopper 13. The inner surface of the locking stopper 13 has an oblique portion 14 on which the cam 7 formed on the cam shaft 6 is located. The compressed helical spring 15 is provided between the locking stopper 13 and the inner surface of the body 1 at the end of the sliding space 12 so as to urge the stopper in a direction A shown in FIG. 1.

The locking lever 16 extends from the cylinder 4 in parallel with the cam shaft 6, and is urged onto the side surface of the locking stopper 13 by a compressed helical spring (not shown) However, the lever 16 is not urged by the spring when the ignition key 5 is not in the cylinder 4. The side surface of the locking stopper 13 has an engagement recess 17 in which the locking lever 16 is engaged when the stopper is moved in a direction reverse to the above-mentioned direction A.

The reinforcing member 18 is inserted in the support hole 10 of the second cylindrical portion 3. The locking bar 20 extends through the hole 19 of the reinforcing member 18 in such a manner that the bar is engaged with the peripheral portion of the locking stopper 13 at one end of the bar, and projects from the reinforcing member at the other end of the bar. The reinforcing member 18 has a stocky portion 21 and a slender portion 22, as shown in FIGS. 3, 4 and 5. The end of the stocky portion 21, which is located opposite the slender portion 22, is arc-shaped to correspond to the form of the inner surface of the second cylindrical portion 3 of the body 1. A projection 23 is formed on the arc-shaped end of the stocky portion 21. The slender portion 22 has slender raised grooves 24, 25, 26 and 27 shaped in such a manner that the height of each slender groove gradually decreases from the end of the slender portion adjacent the stocky portion toward the other end of the slender portion. The slender grooves 25 and 27 have notches 28 and 29 at the ends of the grooves opposite the stocky portion 21. Slender projections, not shown in the drawings, are formed on the second cylindrical portion 3 and located in the support hole 10 thereof so that when the reinforcing member 18 is inserted into the support hole as shown in FIG. 1, the reinforcing member is press-fitted in the support hole while the slender grooves 25 and 27 of the reinforcing member grind the slender projections at the ends of the grooves opposite the stocky portion 21. Since particles made as a result of the grinding are sealed in the notches 28 and 29 of the slender grooves 25 and 27, the particles do not deteriorate the guiding function of the reinforcing member 18 of the locking bar 20.

The compressed helical spring 15, the locking stopper 13, the locking bar 20 and the reinforcing member 18 are inserted, in that order, into the body 1 from the outer end of the support hole 10 of the second cylindrical portion 3 of the body during the assembly of the device. The assembly is thus simplified.

The securing metal member 30 is attached to the mounting juts 11 on the second cylindrical portion 3 of the body 1 so that the tube 31 supporting a steering shaft extending through the tube but not shown in the drawings is secured to the body by the mounting juts and the metal member. The projection 23 of the reinforcing member 18 is fitted in the hole of the tube 31 so that the reinforcing member and the tube are coupled with each other. A locking holder (not shown), is welded on the steering shaft of the steering gear. When the tip of the locking bar 20 is inserted into the hole of the locking holder, the steering shaft is locked by the device so that the steering wheel of the steering gear cannot be turned.

The operation of the device is described in detail below. When the ignition key 5 is inserted into the cylinder 4 and the cylinder is then turned with the key from the locking position in order to operate the motor vehicle, and the cam shaft 6 extending from the cylinder is rotated. When the cylinder 4 is put in one of the other positions, rotation of the cam 7 formed on the cam shaft 6 moves the locking stopper 13 in the direction reverse to the direction A, so that the locking bar 20 is moved into the reinforcing member 18. As a result, the steering wheel may be turned, and the locking lever 16 is located in the engagement recess 17 of the locking stopper 13 as shown in FIG. 6,-so that the stopper is held where it is. When the cylinder 4 is thereafter turned back to the locking position with the key 5, in order to get out of the motor vehicle, the cam 7 is rotated back to its original position as shown in FIG. 1, so that the cam ceases to hold the locking stopper 13. At that time, the locking stopper 13 is still held by the locking lever 16 so that the stopper is unmovable. When the key 5 is then pulled out of the cylinder 4, the locking lever 16 is pivoted so that it ceases to hold the locking stopper 13. As a result, the locking stopper 13 is moved in the direction A so that the locking bar 20 is engaged with the locking holder on the steering shaft to lock it to prevent the steering wheel from being turned.

Since the body 1 is made of the nylon resin, the device weighs less than a conventional device whose body is made of a metal or an alloy. Since the locking bar 20 is guided by the reinforcing member 18 provided in the body 1, the member receives a strong force when the force acts to the bar. For that reason, the force from the locking bar does not directly act on the body 1. Therefore, the body 1 made of the nylon resin is protected from damage. Since the reinforcing member 18 is supported at both ends by the second cylindrical portion 3 of the body 1, the member does not play even if the strong force acts on the member through the locking bar. Since the projection 23 of the reinforcing member 18 is fitted in the tube 31 on the steering shaft, a force acting on the reinforcing member is dispersed to the tube. Since the part of the body 1, to which the locking stopper 13 is opposed, is closed and integrated with the other part of the body, the former part is effectively prevented from being easily destroyed when trying to unlock the steering shaft. In a conventional device in which a locking stopper is inserted into the body of the device through the joining of first and second cylindrical portions of the body, the joint is then covered with a closing member which can be easily destroyed to unlock the steering shaft.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A device for locking a steering gear, comprising:
   a body having a first cylindrical portion and a second cylindrical portion extending substantially perpendicular from said first cylindrical portion;
   a reinforcing member disposed within said second cylindrical portion, said reinforcing member having an inner surface and an outer surface and a bottom portion connected to a tube containing the steering gear, said outer surface including a plurality of raised grooves;
   a locking bar disposed within said reinforcing member and movable between a locked position for locking the steering gear and an unlocked position for allowing the steering gear to rotate; and
   means for moving the locking bar between the locked position and unlocked position.

2. The device of claim 1, wherein said locking bar is movable in a direction of a longitudinal axis of said reinforcing member.

3. The device of claim 1, wherein said body is composed of a molded resin.

4. The device of claim 1, wherein said body is composed of a molded nylon resin mixed with fiberglass.

5. The device of claim 1, wherein said raised grooves have notches at the ends of said grooves.

6. The device of claim 1, wherein said means for moving the locking bar comprises a locking stopper connected to one end of said locking bar spring disposed between said locking stopper and an inner portion of said second cylindrical portion for urging the locking stopper and locking bar away from said inner position so that said locking bar is in the locked position, and means for raising the locking stopper and locking bar toward said inner portion so that said locking bar is in the unlocked position.

7. The device of claim 6, wherein said means for raising the locking stopper and locking bar comprises a rotatable cylinder disposed within said first cylindrical portion and rotatable when an ignition key is inserted into said rotatable cylinder, a cam shaft having one end connected to said rotatable cylinder, a cam connected to another end of said cam shaft and engageable with said locking stopper, said cam raising said locking stopper and said locking bar when said rotatable cylinder is rotated.

* * * * *

UNITED STATES PATENT AND TRADEMARK OFFICE
CERTIFICATE OF CORRECTION

PATENT NO. : 5,230,233
DATED : July 27, 1993
INVENTOR(S) : Takeshi Shoji et al.

It is certified that error appears in the above-indentified patent and that said Letters Patent is hereby corrected as shown below:

Claim 6, column 6, line 9, after "bar insert --,a--.

Signed and Sealed this

Tenth Day of May, 1994

Attest:

BRUCE LEHMAN

Attesting Officer  Commissioner of Patents and Trademarks